April 26, 1960 L. J. BRANCATO 2,934,123
COIL INSERT WITH AN OUTER ENGAGING LOCKING COIL
Filed July 24, 1957 3 Sheets-Sheet 2
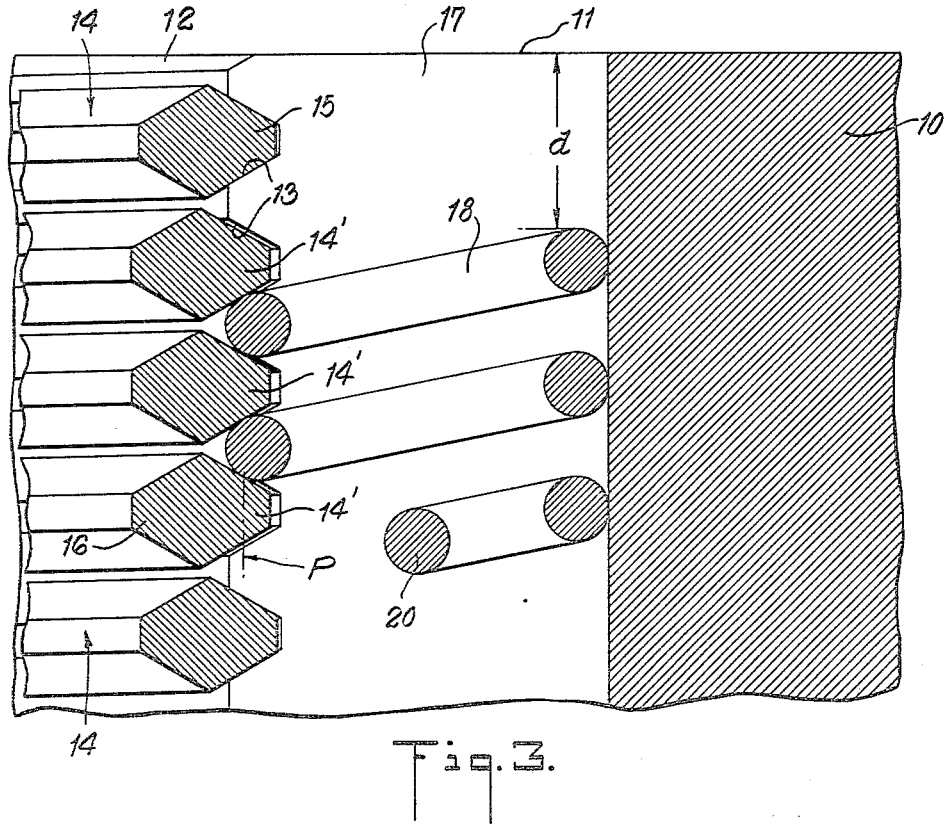
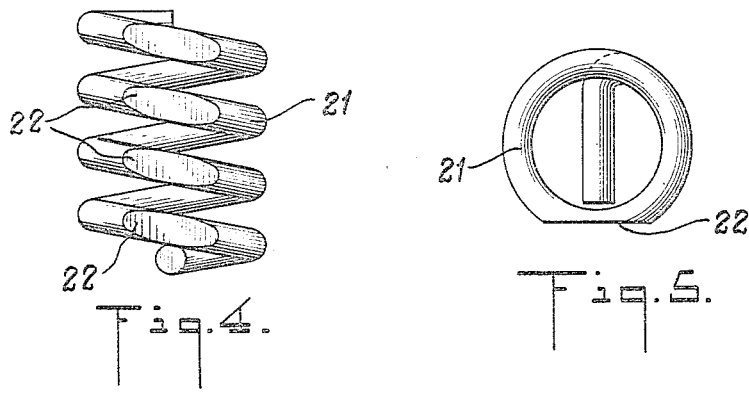
INVENTOR.
LEO J. BRANCATO
BY Walter S. Bleston
ATTORNEY April 26, 1960     L. J. BRANCATO     2,934,123
COIL INSERT WITH AN OUTER ENGAGING LOCKING COIL
Filed July 24, 1957     3 Sheets-Sheet 3
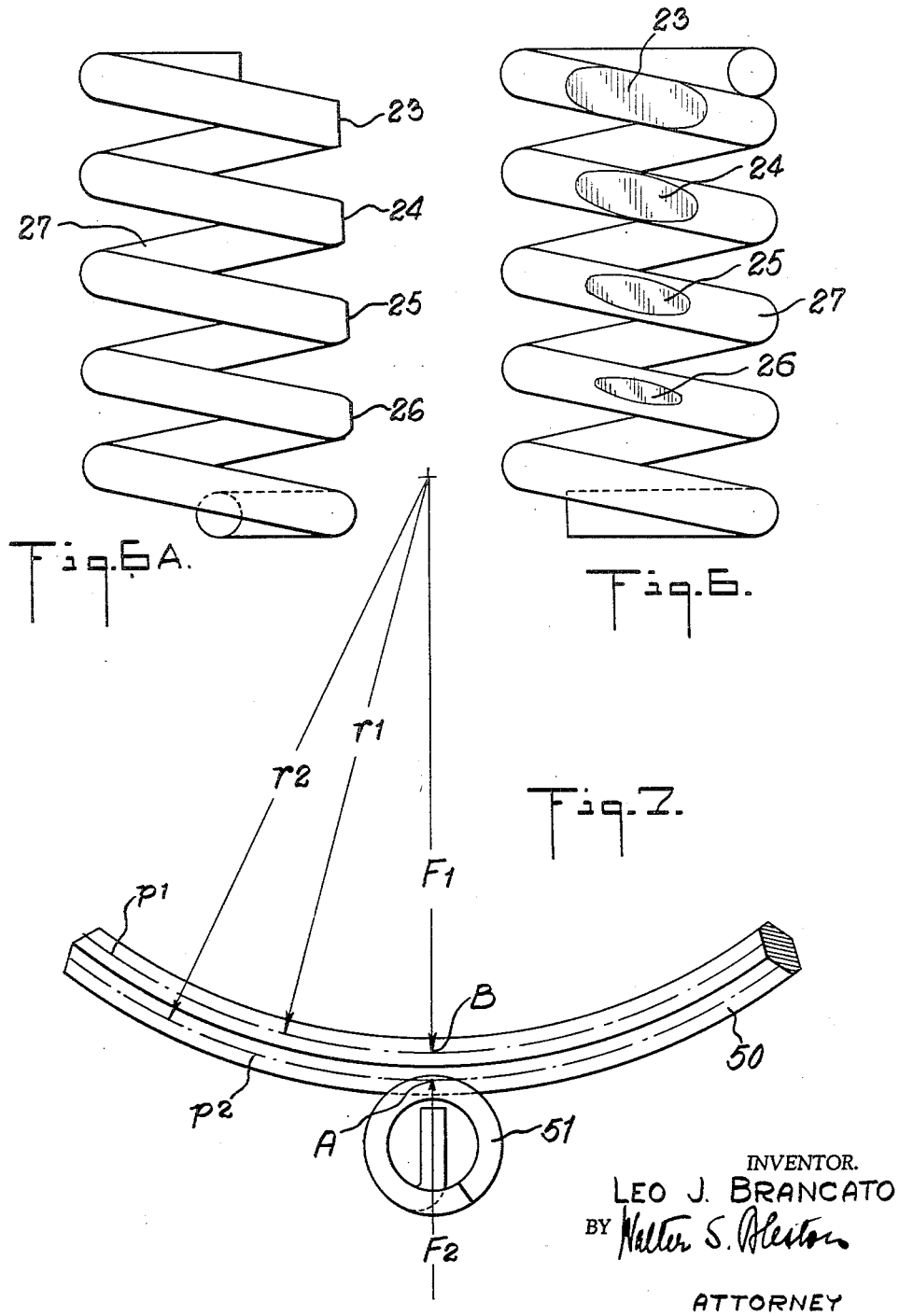
INVENTOR.
LEO J. BRANCATO
BY Walter S. Bleston
ATTORNEY

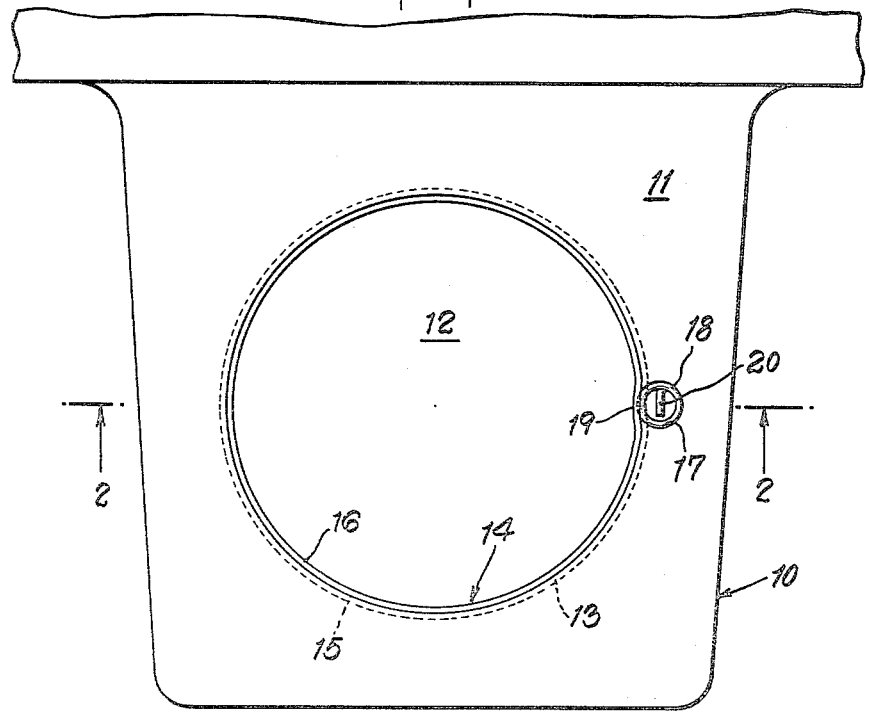
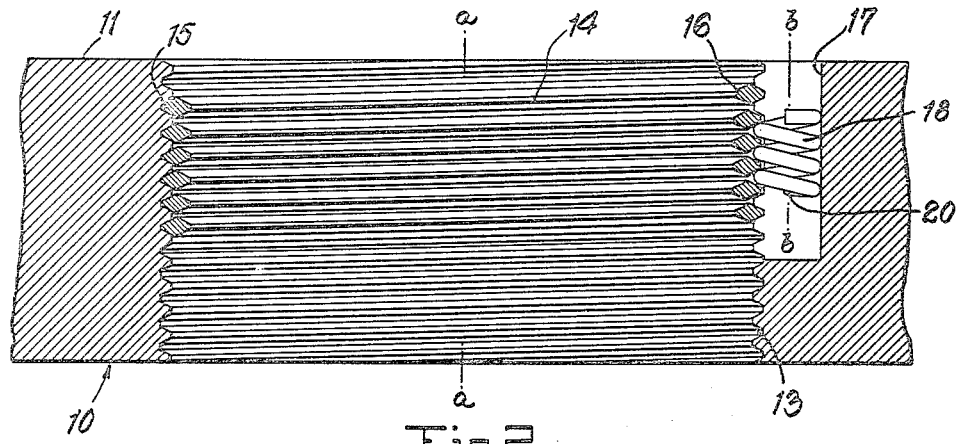

United States Patent Office 2,934,123
Patented Apr. 26, 1960

2,934,123
COIL INSERT WITH AN OUTER ENGAGING LOCKING COIL

Leo J. Brancato, Danbury, Conn., assignor to Heli-Coil Corporation, Danbury, Conn., a corporation of Delaware Application July 24, 1957, Serial No. 673,781

5 Claims. (Cl. 151—14)

The invention relates to a thread insert assembly especially for large screw thread sizes.

Whereas there are satisfactory designs for providing wire screw thread inserts of limited sizes with a desired torque effect or self-locking properties, the conventional means are not very well applicable to large size screw threads of e.g. one and a half inch or larger diameter. The drawbacks of the conventional means consist in that they either involve high development cost, which can only be justified in high volume applications, or that they lack a desirable resilient interference, or even that they are not applicable because of a lack of accessibility.

The invention aims, therefore, to avoid the mentioned drawbacks and to provide wire coil screw thread inserts particularly for large screw thread sizes with desired torque properties.

The invention also aims to provide inserts of the mentioned type with a variable torque effect without requiring any modification of the insert tooling.

Another object of the invention is to provide such inserts with self-locking properties.

It is another object of the invention to provide for the indicated purpose, means which are applicable where broad, flat surfaces have no exposed edges from which such means as set screws or the like can be introduced.

The invention essentially consists in that a small locking spring is introduced into a bore parallel to that into which the screw thread insert of large diameter is to be placed and wherein the locking spring wound left-handed if the insert is wound right-handed and vice versa, engages between convolution portions of the screw thread insert to displace the engaged portions.

Further details and objects of the invention will be apparent from the description given hereinafter and the accompanying drawing illustrating an embodiment thereof by way of example.

In the drawing:

Fig. 1 is a top plan view of an assembly according to the invention;

Fig. 2 is a cross-section along line 2—2 of Fig. 1;

Fig. 3 is a partial cross-section similar to Fig. 2 on a much larger scale;

Fig. 4 is a side elevation of a modified locking spring;

Fig. 5 is an end view of the locking spring of Fig. 4;

Fig. 6 is a side elevation of another locking spring on a larger scale;

Fig. 6a is an elevation at 90° with respect to that of Fig. 6; and

Fig. 7 is a diagram illustrating certain equations used in the description of the invention.

Referring now to the drawing, a structural member 10 having a broad flat surface 11, is provided with a large diameter bore 12 which is interiorly screw threaded at 13. A screw thread wire coil insert 14 of conventional substantially diamond-shaped cross-section is screwed with its outer portion 15 into the thread 13 whereas its inner portion 16 forms a female thread for the reception of a male member (not shown). Parallel to the center line $a$—$a$ of the bore 12, another bore 17 of a relatively much smaller diameter and center line $b$—$b$ is provided which, however, has a smooth cylindrical rather than a screw threaded inner surface. Into the bore 17, a locking coil spring 18 of a round wire cross-section is installed. This spring is wound left-handed if the insert 14 forms a right-hand thread, or it is right-handed for a left-hand insert. The spring is wound with a pitch equal to that of the insert so that the spring convolutions can project from the outside between the convolutions of the insert and the diameter of the spring wire is so selected that the spring convolutions can contact the insert convolutions on the pitch diameter $p$ of the latter. The diameter of the bore 17 and, consequently, also the outer diameter of the spring 18 and the distance of the center lines $a$—$a$ and $b$—$b$ from each other are so selected that the spring wire will interfere with the screw thread insert and urge the portions of the convolutions engaged by the spring a desired distance radially inwards, as shown in Fig. 1 at 19 and also in Fig. 3 where the convolution portions 14' are displaced relatively to the normal position as occupied by the convolutions 14. The distance between the center lines $a$—$a$ and $b$—$b$ will vary in accordance with the torque effect desired when a male screw member is screwed into the installed insert.

In a certain instance I obtained good resutls in the case of a conventional insert of 2¾ inches and 12 convolutions per inch with a locking spring of .240 inch diameter wound of a wire of .048 inch wherein the distance between the center lines $a$—$a$ and $b$—$b$ was so selected that the radial displacement of the insert convolution amounted to .005 inch. However all the dimensions are variable according to the locking torque desired. Depending upon the size of the screw thread inserts, deformations of .005 to .020 inch have been found practical. In most instances, it is advisable to make the locking spring of a harder and stiffer material than the insert. Thus, the spring may be made of music wire whereas the insert consists of a stainless steel.

Quite in general, the amount of torque obtained from the lock spring can be varied by a number of ways, viz:

The length of the locking spring can be varied so that more or less convolutions of the insert will be displaced.

The amount of interference may be varied by varying the spacing of the center lines of the bores.

The stiffness of the lock spring may be varied by changing the mean diameter so that the action of the lock spring is softer for a large diameter spring and stiffer for a small diameter spring of the same round wire cross-section.

Finally, the number of lock springs may be varied, that means, that several lock springs may be spaced about the circumference of the assembled insert if the torque effect from one lock spring is insufficient.

In order to install the assembly, first the lock spring 18 will be screwed into the bore 17. For this purpose, the leading end of the spring may have a diametrical tang indicated at 20 in Fig. 1 which may be gripped by a torque applying tool. As the intersection of the smooth bore 17 with the tapped hole 12 causes uniformly spaced openings at the one side of the bore 17, the spring is at least partly guided during its installation. After the locking spring is in position, the screw thread insert may be installed. This sequence of steps is preferred since the amount of displacement relative to the diameter favors displacement of the insert during the installation. Where, as in most instances, the number of convolutions of the lock spring is much smaller than that of the screw thread insert, the locking feature or torque effect can be provided at any desired part of the insert by locating the spring at a smaller or greater distance $d$ from the surface provided with the bores 12 and 17.

It will be noted that in an assembly according to the invention a displacement of portions of the insert takes place rather than a deformation of the wire cross-section of the insert. This is an important advantage over certain conventional inserts having locking qualities.

It is also to be noted that the lock spring proper is secured owing to the fact that there is no rotational friction transferred to the spring by the screw engaging the insert. Since the locking spring is not urged to rotate, it will not move out in either direction.

On the other hand, the lock spring also prevents the insert from moving. This is true regardless of the amount of self-locking torque. This also applies within the limit of contact pressure below which seizure or galling does not take place between a screw and the insert. This is true regardless of the amount of self-locking torque. This also applies within the limit of contact pressure below which seizure or galling does not take place between a screw and the insert. This is a distinctive feature, since it permits the use of relatively short length inserts, without concern for movement of the insert caused by a screw rotation. The advantage offered by the invention in this respect will be appreciated if it is considered that hitherto, in many instances, it was necessary to make the inserts of a length of at least one and a half times the diameter when using locking inserts of other kinds in order to insure that the friction between insert and tapped hole exceeds the friction between the screw and the insert.

From Fig. 7 it can be readily taken that in an assembly according to the invention the insert is secured by the spring and that the insert cannot be taken along by the rotation of a screw engaging it. In Fig. 7, a portion of an insert is denoted by 50 and a portion of a locking spring by 51. The spring 51 engages the insert at point A located on the outer pitch circle $p_2$ of the insert. If now, owing to the displacement of an insert portion by the spring 51, a pressure $F_1$ is exerted by a screw rotating in engagement with the insert, this pressure will act at the point B on the inner pitch circle $p_1$ of the insert and cause an equally strong reaction $F_2$ at the point A. If $\mu_1$ is the coefficient of kinetic friction and $\mu_2$ the coefficient of static friction, and furthermore, the radius of the inner pitch circle is denoted by $r_1$ and the radius of the outer pitch circle by $r_2$, then the torque acting on the insert due to the screw rotation and tending to take the insert along, is $$T = F_1 r_1 \mu_1$$

and the torque on the insert caused by the lock spring and resisting the torque $T_1$ is $$T_2 = F_2 r_2 \mu_2 \text{ or as } F_2 = F_1$$
$$T_2 = F_1 r_2 \mu_2$$

Now $r_2$ is greater than $r_1$ and $\mu_2$ greater than $\mu_1$; consequently $T_2$ is also greater than $T_1$.

Hence in an assembly of insert and lock spring according to the invention, the torque on the insert caused by the lock spring will always exceed the torque on the insert caused by rotation of the screw.

Figs. 4 and 5 show a modified locking spring 21 in which the convolutions are flattened at 22 on one side. If, in an assembly with a screw thread insert as described hereinbefore, the spring 21 is so applied that the flattened side faces the insert, the latter will not be engaged by the spring and, therefore, remains not displaced. If, however, the spring is turned 90°, the convolutions will bear against and displace the insert convolutions, as described with respect to the spring 18. By providing flattenings of the spring convolutions through arcs of different sizes it is also possible to modify the torque effect with one and the same locking spring. This is shown in Figs. 6 and 6a where the flattenings 23, 24, 25 and 26 of the spring 27 are of different lengths.

It will be apparent to those skilled in the art that many alterations and modifications of the structure shown and hereinbefore described can be made without departure from the essence and spirit of the invention which for that reason shall not be limited but by the scope of the appended claims.

I claim:

1. A screw thread insert assembly comprising a member provided with a first internally screw threaded bore of relatively large diameter and with a second smooth bore of much smaller diameter, said bores having parallel center lines so spaced that said second bore intersects the thread of said first bore, a wire coil insert having inner and outer screw thread forming portions and engaging with said outer portions of said thread of said first bore, and a locking coil spring stiffer than said insert and wound, in a direction contrary to that of said insert, from a round wire having a diameter larger than the spacing of two adjacent insert convolutions on the outer pitch cylinder of the latter, said coil spring being shorter than said second bore and having a diametrical tang at one of its ends and being positioned in said second bore so that each of its convolutions engage said insert from the outside between two adjacent convolutions substantially on the pitch diameter of said outer screw thread-forming portion thereby urging the engaged insert convolutions radially inwards, said coil spring being rotatable by virtue of its tang for an adjustable change of its position in said second bore but being non-rotatable by a torque frictionally exerted on the insert by a male member being screwed into the latter.

2. A screw thread insert assembly as in claim 1, the wire of said insert being of stainless steel and having a substantially diamond shaped cross-section and said locking spring being of a harder material and having a circular cross-section.

3. A screw thread insert assembly as in claim 1, wherein the number of convolutions of said locking spring is much smaller than the number of convolutions of said insert.

4. A screw thread insert assembly as in claim 1, the convolutions of said locking spring being flattened in one plane.

5. A screw thread insert assembly as in claim 1, the convolutions of said locking spring being provided with flattenings, respectively, said flattenings differing as to their peripheral extension.

References Cited in the file of this patent
UNITED STATES PATENTS

| | | |
|---|---|---|
| 1,804,348 | Kubacki | May 5, 1931 |
| 2,688,355 | Forster | Sept. 7, 1954 |

FOREIGN PATENTS

| | | |
|---|---|---|
| 672,157 | France | Sept. 14, 1929 |
| 1,027,640 | France | Feb. 18, 1953 |